(No Model.)  2 Sheets—Sheet 1.
E. A. COOLEY.
BOX WIRING OR HOOPING MACHINE.

No. 529,247.  Patented Nov. 13, 1894.

Witnesses,

Inventor,
Edward A. Cooley
By Dewey & Co.
Attys (No Model.) 2 Sheets—Sheet 2.

E. A. COOLEY.
BOX WIRING OR HOOPING MACHINE.

No. 529,247. Patented Nov. 13, 1894.

Witnesses,

Inventor,
Edward A. Cooley
By Dewey & Co.
attys

UNITED STATES PATENT OFFICE.

EDWARD A. COOLEY, OF CLOVERDALE, CALIFORNIA.

BOX WIRING OR HOOPING MACHINE.

SPECIFICATION forming part of Letters Patent No. 529,247, dated November 13, 1894.

Application filed March 16, 1894. Serial No. 503,933. (No model.)

*To all whom it may concern:*

Be it known that I, EDWARD A. COOLEY, a citizen of the United States, residing at Cloverdale, Sonoma county, State of California, have invented an Improvement in Box Wiring or Hooping Machines; and I hereby declare the following to be a full, clear, and exact description of the same.

My invention relates to an apparatus which is adapted to apply hoops, bands or wires around boxes for the purpose of strengthening and securing them.

It consists of the constructions and combinations of devices hereinafter fully described and claimed.

Figure 1:
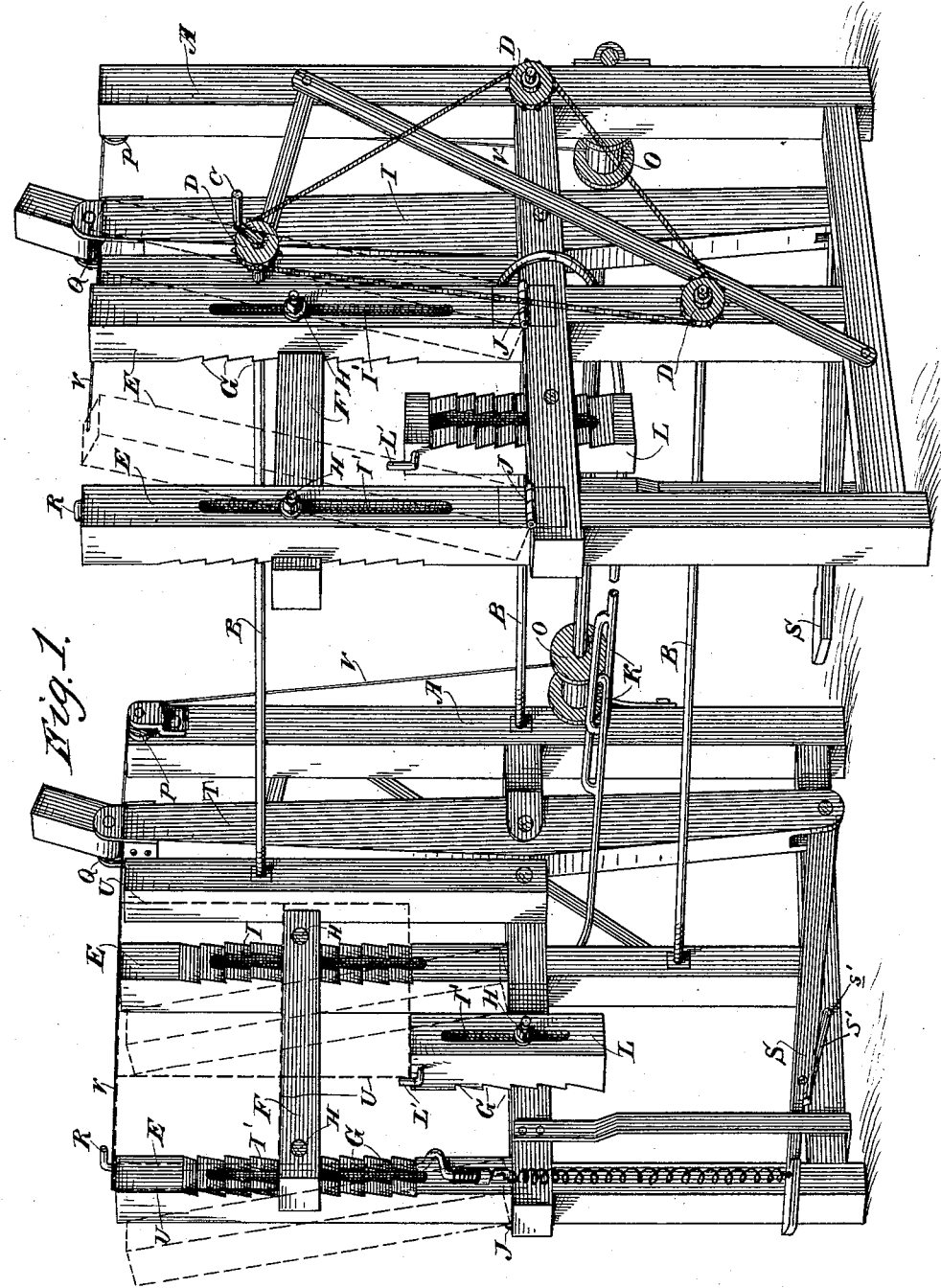
Figure 2:
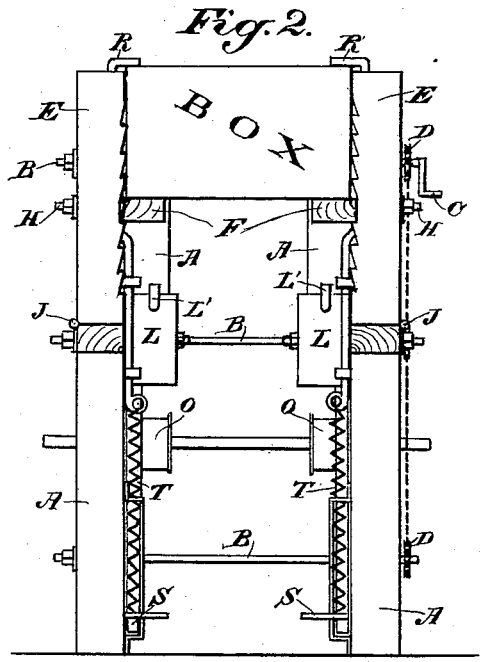
Figure 3:
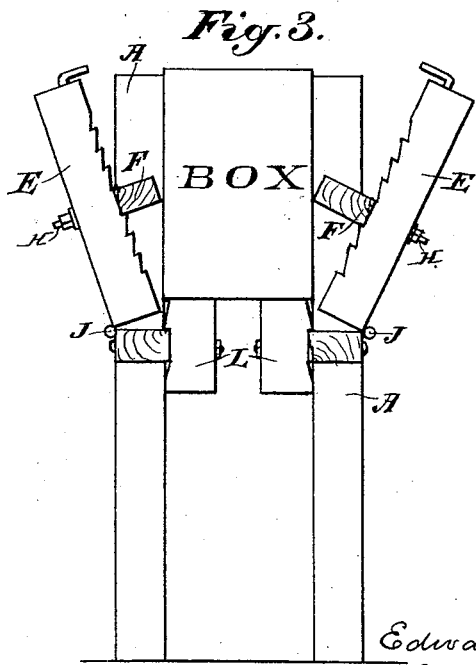

Figure 1 is a perspective view showing the parts of the machine considerably separated from each other for clearness of illustration. Fig. 2, is a side view showing the end frames brought closer together and the bottom of a box resting upon the support F. Fig. 3, is a similar view showing the supplemental frames opened outwardly, the main frames brought still closer together, and a box with its side resting upon the supports L.

A A is the frame of the machine composed of end pieces which are united by bars or rods B extending from one to the other, and through these rods the frames are adjusted to suit the size of boxes to be operated on, in any suitable manner. In the present case, these rods have one end screw-threaded, and these screw-threads enter corresponding nuts attached to the frame at that end, while the other ends rotate without advancing. When the screws are rotated in one direction, the end frames A are brought nearer together. When rotated in the opposite direction they are separated. This enables the operator to adjust the frames to suit the dimensions of the box to be operated on. In order to operate the screws conveniently and simultaneously, I have shown a crank C attached to one of the screw shafts, and sprocket-wheels D are fixed to all of them having a chain passing around the sprockets, so that when the crank is turned all the screws will be turned simultaneously and the frames thus advanced to or from each other.

To the front portion of each end frame vertical holding frames E are hinged in such a manner that they may open outwardly as shown in dotted lines in Fig. 1, and in full lines in Fig. 3, and upon these frames are transverse bars F to support the ends of the box U, these bars resting upon notches G made in the vertical posts of the hinge frames, and having bolts H which pass through slots I' in these posts. Nuts on the ends of these bolts allow them to be tightened to secure the supporting bars at any desired point, or the bars may be clamped or secured in any other suitable manner.

The frames E are hinged as shown at J so as to turn outwardly about their hinge joints, and they are connected by rods K fixed to them and loosely linked together at their meeting point in the center, so that the operator only needs to press the frame outwardly with the knee to open and separate the vertical frames E, and they will assume a vertical position by gravitation whenever released.

The operation of banding a box is commenced by first placing it with its bottom resting upon the supporting bars F, see Fig. 2, while the frames E are in their normal vertical position. The ends of the wires or bands V are then fastened to the top of the box, after which the box is turned upon its side. If the box is wider than its depth, the frames E are separated, by pressing the knee against one of the rods K and this allows the ends of the box to rest upon the supporting blocks L (Fig. 3) fastened to the main frames, below the supports F, and adjustable in a similar manner. The wire or band which is contained upon reels O is led from these reels over direction pulleys P, passing thence through eccentric clamps Q, and across the upper side of the box which is brought on a level with the clamp by the adjustment of the supporting bars or blocks. The box is secured and steadied in place by holding lugs R which press down upon the upper side, and are operated by being connected with a treadle as shown, or by other suitable means. The band or wire is then drawn tight across the side of the box by closing the clamp Q upon it, and then moving it, or the box, so as to produce the desired tension. In the present case the clamps are fixed to the upper ends of oscillating levers I fulcrumed to the frame. By means of a treadle S connected with the lever I, upon the upper end of which the clamp Q is fixed, the lever I is moved about its pivot pin so as to tighten and strain the wire or band across the box, holding it until it has been properly secured along the side which is then uppermost. The forward portion of the treadle S is connected with one end of a swinging arm S' pivotally secured at s' to the frame A as shown in Fig. 1. The wire or band being thus secured, the box is turned over, and the vertical frames E are allowed to move toward each other by gravitation when released, until they stand in a vertical position, and the transverse bars F are in proper position to receive the side of the box when it has been again turned a partial revolution from its former position. These bars are so adjusted that the depth of the box will just bring it to the proper height, so that the wire again lies across the part which is uppermost, and the box is again clamped in place, and the wire or band stretched across while being nailed or secured. In like manner, the other end is banded and fastened either simultaneously if two men are working, or the ends are finished successively before turning, if but one man is employed.

In the drawings, I have shown the frames A A separated a considerable distance in order to better show their construction, but it will be understood that in operation they are sufficiently near together so that the box rests upon the supports L or F of each of the frames, as shown in Figs. 2 and 3, and each of the frames carries an operating tension device and foot lever, so that the two ends or sides of the box may be done successively.

The supports L are provided with transversely adjustable hooks or supports L' which press against the lower front edges of the box when in place to prevent its being displaced when the band is stretched across it.

Having thus described my invention, what I claim as new, and desire to secure by Letters Patent, is—

1. A box wiring or banding machine, consisting of end frames A adjustable toward and from each other, and having their upper portions adapted to swing outwardly, adjustable supports carried by said upper portions, upon which the box rests, means for supplying the banding material, a lever carrying a clamping device at its upper end for grasping the banding material, and a foot lever connected with the lower portion of said lever whereby the banding material is drawn to the proper tension when being secured upon the box.

2. In a box banding machine, the end frames with mechanism whereby they are adjusted to or from each other, supplemental frames hinged to the end frames and adapted to tilt outwardly about their hinges, adjustable supports attached to the main frame below the supplemental frames and adapted to receive and support the ends of the box in position to receive the band, and mechanism for holding the box and for straining the band across it while being fastened, substantially as herein described.

3. A box banding machine consisting of end frames with mechanism whereby they are adjusted to or from each other, supplemental frames hinged to the end frames and mechanism whereby they may be opened outwardly or drawn into a vertical position, transverse bars adjustably attached to the supplemental frames adapted to support the box when it has been turned into one position, whereby the band extends across the part of the box which is uppermost, and the tightening and straining mechanism for holding the band while it is being secured, substantially as herein described.

4. In a box banding machine, the end frames with mechanism whereby they are adjusted to and from each other, supplemental frames hinged to the front portion and opening outwardly about their hinges, bars linked together in the center and having their outer ends fixed to the hinge frames whereby a movement of one of the frames is communicated to the other and acts to open or close the frames with relation to each other as described.

5. In box banding machine, the vertical main frames, supplemental frames hinged to said main frames and adapted to tilt outwardly about the hinges, mechanism by which said main frames are moved to or from each other, main and supplemental supports for the boxes in different positions between these main and supplemental frames, reels upon which the banding material is coiled from which it passes over guide pulleys, swinging levers and treadles whereby they are actuated, clamps upon said levers adapted to grasp the banding material and to strain it across the box while it is being nailed thereon, substantially as herein described.

In witness whereof I have hereunto set my hand.

EDWARD A. COOLEY.

Witnesses:
S. H. NOURSE,
H. F. ASCHECK.